United States Patent
Katagiri et al.

(10) Patent No.: US 7,264,233 B2
(45) Date of Patent: Sep. 4, 2007

(54) HUMIDIFIER

(75) Inventors: Toshikatsu Katagiri, Saitama (JP); Yoshio Kusano, Saitama (JP); Ryoichi Yoshitomi, Saitama (JP); Kenji Nagumo, Saitama (JP); Motohiro Suzuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 107 days.

(21) Appl. No.: 11/138,198

(22) Filed: May 25, 2005

(65) Prior Publication Data

US 2005/0280166 A1 Dec. 22, 2005

(30) Foreign Application Priority Data

May 25, 2004 (JP) .............................. 2004-154426

(51) Int. Cl.
*B01F 3/04* (2006.01)

(52) U.S. Cl. ....................................... 261/104; 429/34

(58) Field of Classification Search ................ 261/104, 261/107, DIG. 4; 429/34, 39
See application file for complete search history.

(56) References Cited

U.S. PATENT DOCUMENTS

| | | | |
|---|---|---|---|
| 6,554,261 B2* | 4/2003 | Katagiri et al. ............. 261/154 |
| 6,755,399 B2* | 6/2004 | Shimanuki et al. .......... 261/104 |
| 2002/0039674 A1* | 4/2002 | Suzuki et al. ................. 429/30 |
| 2002/0041989 A1* | 4/2002 | Shimanuki et al. ............ 429/34 |
| 2002/0098395 A1* | 7/2002 | Shimanuki et al. ............ 429/13 |
| 2004/0072052 A1* | 4/2004 | Yamamoto et al. ........... 429/34 |
| 2004/0084789 A1* | 5/2004 | Yan et al. .................... 261/107 |
| 2006/0019141 A1* | 1/2006 | Okuto et al. .................. 429/34 |
| 2006/0147774 A1* | 7/2006 | Suzuki et al. ................. 429/26 |

FOREIGN PATENT DOCUMENTS

| | | |
|---|---|---|
| JP | 10-106593 | 4/1998 |
| JP | 2003-157872 | 5/2003 |

* cited by examiner

*Primary Examiner*—Scott Bushey
(74) *Attorney, Agent, or Firm*—Fish & Richardson P.C.

(57) ABSTRACT

Disclosed is a humidifier for humidifying dry gas by transferring moisture from moist gas. A humidifier comprising: a housing having a first area for passing a first gas and a second area for passing a second gas having higher water content than that of said first gas; a moisture permeable means for transferring moisture from said second gas to said first gas to humidify the first gas; and a communicating path formed on the housing through which the first area and the second area communicate with each other, to transfer condensed water formed in the first area to the second area.

18 Claims, 6 Drawing Sheets

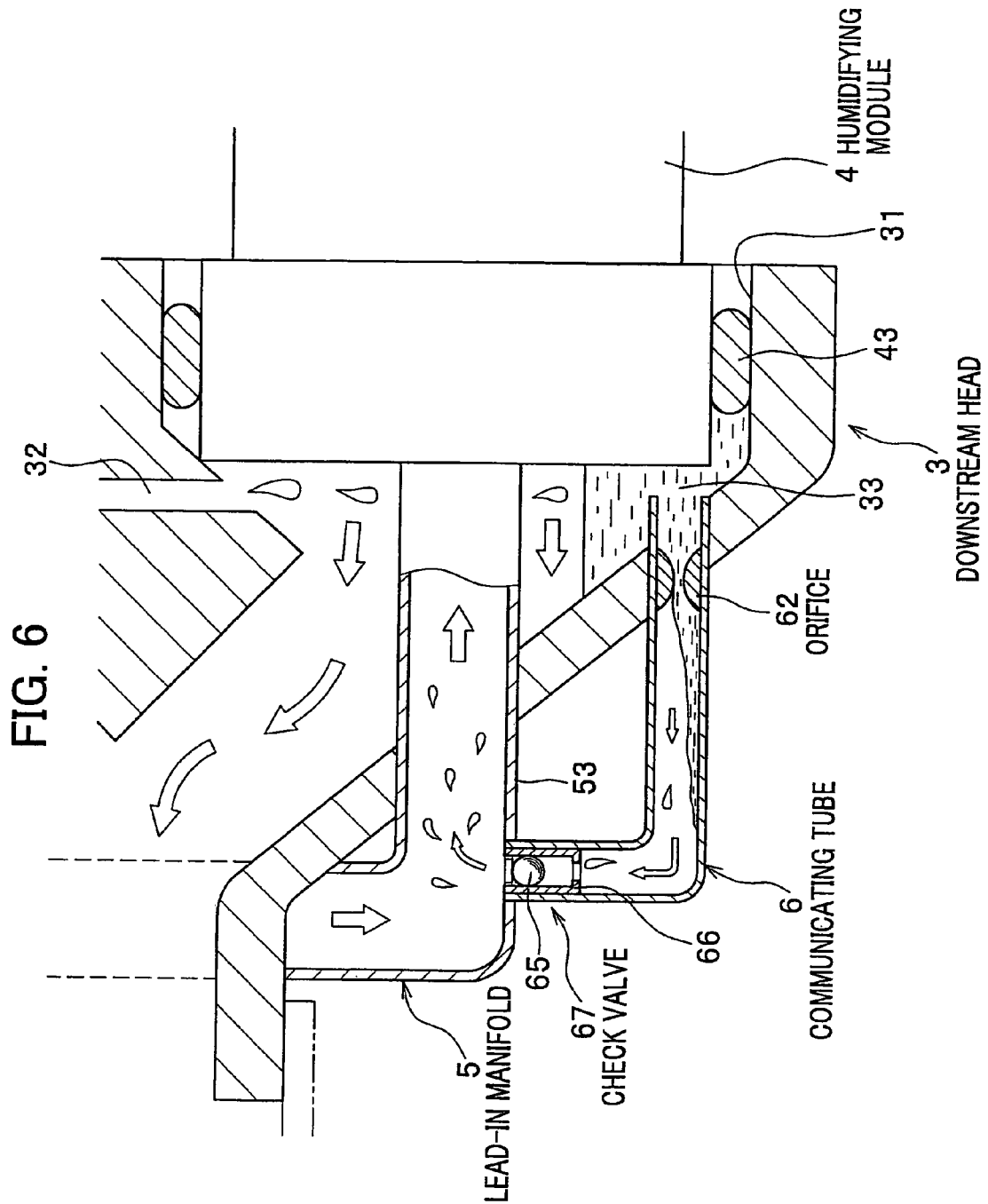

HUMIDIFIER

BACKGROUND OF THE INVENTION

1. Field of the Invention

The present invention relates to a humidifier for humidifying dry gas by transferring moisture from moist gas.

2. Description of the Related Art

Recently, fuel cell electric vehicle (FCEV) has come to attention mainly from the viewpoint of suppressing carbon dioxide emission which is one contributor to global warming. In such a fuel cell electric vehicle, a fuel cell (FC) generates electricity by means of an electrochemical reaction of hydrogen ($H_2$) and oxygen ($O_2$) contained in air, and the generated electricity is supplied to a motor which in turn generates drive power.

With respect to the fuel cell for FCEV, a fuel cell of PEM (proton exchange membrane) type, for example one in which solid polymer is used as an electrolyte, has been widely used since the solid polymer endows the fuel cell with advantages, such as small size, light weight, high efficiency and high output. Among the solid polymers is fluorocarbon polymer used in the form of an ion-exchange film. It functions as a proton conducting electrolyte when containing moisture. However, when moisture is not present, its proton conducting property is greatly lost and electrical contact with the electrodes becomes poor, resulting in drastic drop in the output. In order to overcome this deficiency of the fuel cell system, it is necessary that the gases supplied to the anode and the cathode (i.e. anode gas and cathode gas) be humidified using a humidifier so that a certain level of humidity is maintained in the electrolyte.

As for the humidifier to be used for humidifying a reaction gas, various types have been proposed and used. Japanese Unexamined Patent Application Publication 2003-157872 (see paragraphs [0014] and [0020] and FIG. 1) proposed a humidifier in which a reaction gas is humidified through hollow fiber membranes utilizing moisture contained in off-gas exhausted from the fuel cell, since no external water supply nor electric power is required, and in addition, humidification requires no complex structure. One example of this type of humidifier is mainly composed of a humidifying module including a bundle of a plurality of hollow fiber membranes contained in a cylindrical case, and heads attached to the both ends of the humidifying module. A reaction gas (hydrogen gas or oxygen-containing gas) is introduced into the humidifying module from a feed inlet formed on one of the two heads, and after flowing along the hollow part of the hollow fiber membranes, it is exhausted from an outlet formed on the other head. On the other hand, off-gas (anode gas or cathode gas) is introduced from an inlet formed on the latter head into the humidifying module, and after flowing outside the hollow fiber membranes, it is exhausted from an outlet formed on the former head. With these flows of the gases, moisture contained in the off-gas permeates the pores on the hollow fiber membranes due to the difference in partial pressures of water vapor across the membrane, and humidifies the reaction gas running along the hollow part of the hollow fiber membranes.

With such a humidifier using the hollow fiber membrane, it is inevitable that moisture in the reaction gas will be condensed into water when the reaction gas humidified in the humidifying module is brought into contact with the head with lower temperature than that of the reaction gas. If the condensed water remains in the head during nonoperational period of the vehicle, problem arises in that, for example, during severe cold weather, the condensed water may become frozen and clogs the flow passage of the reaction gas, leading to low performance of the fuel cell system upon the next operation. In order to solve this problem, various proposals have been made, in which the condensed water is expelled through drain piping to the external system (e.g. beneath the vehicle), or in which the condensed water is collected in a drain tank mounted on the rear part or the like of the vehicle. However with these proposals, there still remains a problem in that the condensed water is not drained from the head at the next operation, if the condensed water in the drain piping or drain tank became frozen during nonoperational period of the fuel cell system.

The present invention has been made based on the above-mentioned background, and the object is to provide a humidifier in which the clogging of the gas flow passage caused by the remaining condensed water is prevented, while keeping the humidifier still simple and cost-effective to manufacture.

SUMMARY OF THE INVENTION

According to an aspect of the present invention, there is provided a humidifier including:

a housing having a first area for passing a first gas and a second area for passing a second gas having higher water content than that of the first gas;

a moisture permeable means for transferring moisture from the second gas to the first gas to humidify the first gas; and a communicating path formed on the housing through which the first area and the second area communicate with each other, to transfer condensed water formed in the first area to the second area.

According to another aspect of the present invention, there is provided a fuel cell containing the above-mentioned humidifier.

BRIEF DESCRIPTION OF THE DRAWINGS

Hereinbelow, embodiments of the humidifier of the present invention will be described in detail with reference to the accompanying drawings.

FIG. 6 shows a vertical sectional view of the relevant part of a humidifier according to another modified embodiment.

DETAILED DESCRIPTION OF THE EXEMPLARY EMBODIMENTS OF THE INVENTION

<Structure of Vehicle>

Figure 1:
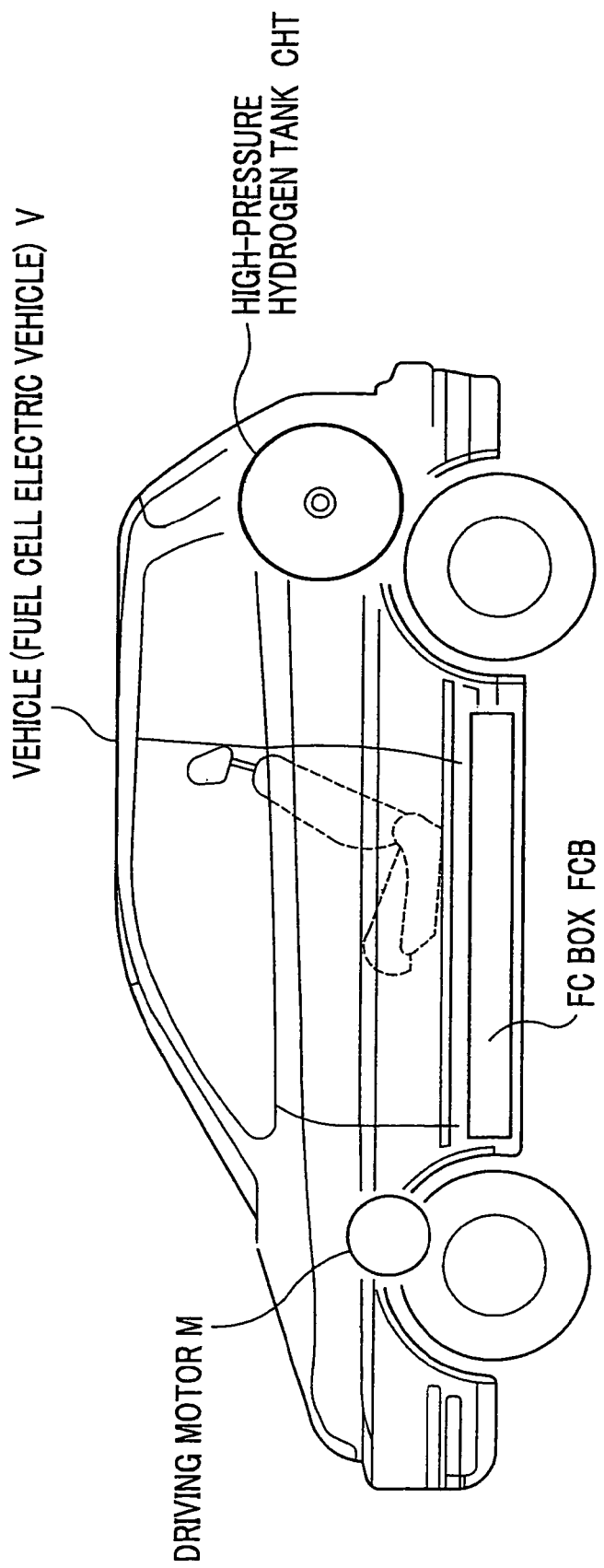
FIG. 1 shows a partially perspective side view of a vehicle to mount a fuel cell system according to one embodiment of the present invention.

First, the structure of a vehicle is explained. Referring to a vehicle V in FIG. 1, an FC box (FCB) is mounted underneath the floor on which driver/passenger seats are set. In the FCB, a fuel cell 110 (see FIG. 2) is contained. A driving motor M is installed on the front part of the body, and a high-pressure hydrogen tank CHT is transversely mounted above the rear wheels.

The fuel cell 110 generates electricity by means of an electrochemical reaction between oxygen in air and hydrogen, and the generated electricity is introduced to the driving motor M which in turn generates power to move the vehicle V. The fuel cell 110 in this embodiment is a PEM (proton exchange membrane) type fuel cell, which is a solid polymer type fuel cell. The fuel cell has a laminated structure made of, for example, from several tens to several hundreds of unit cells, each of which is formed by sandwiching an electrolyte between an anode and an cathode (this sandwiched structure is referred to as MEA (membrane electrode assembly)), and further sandwiching the MEA between separators (this structure of unit cell is not shown in the drawing).

<Structure of Fuel Cell System>

Figure 2:
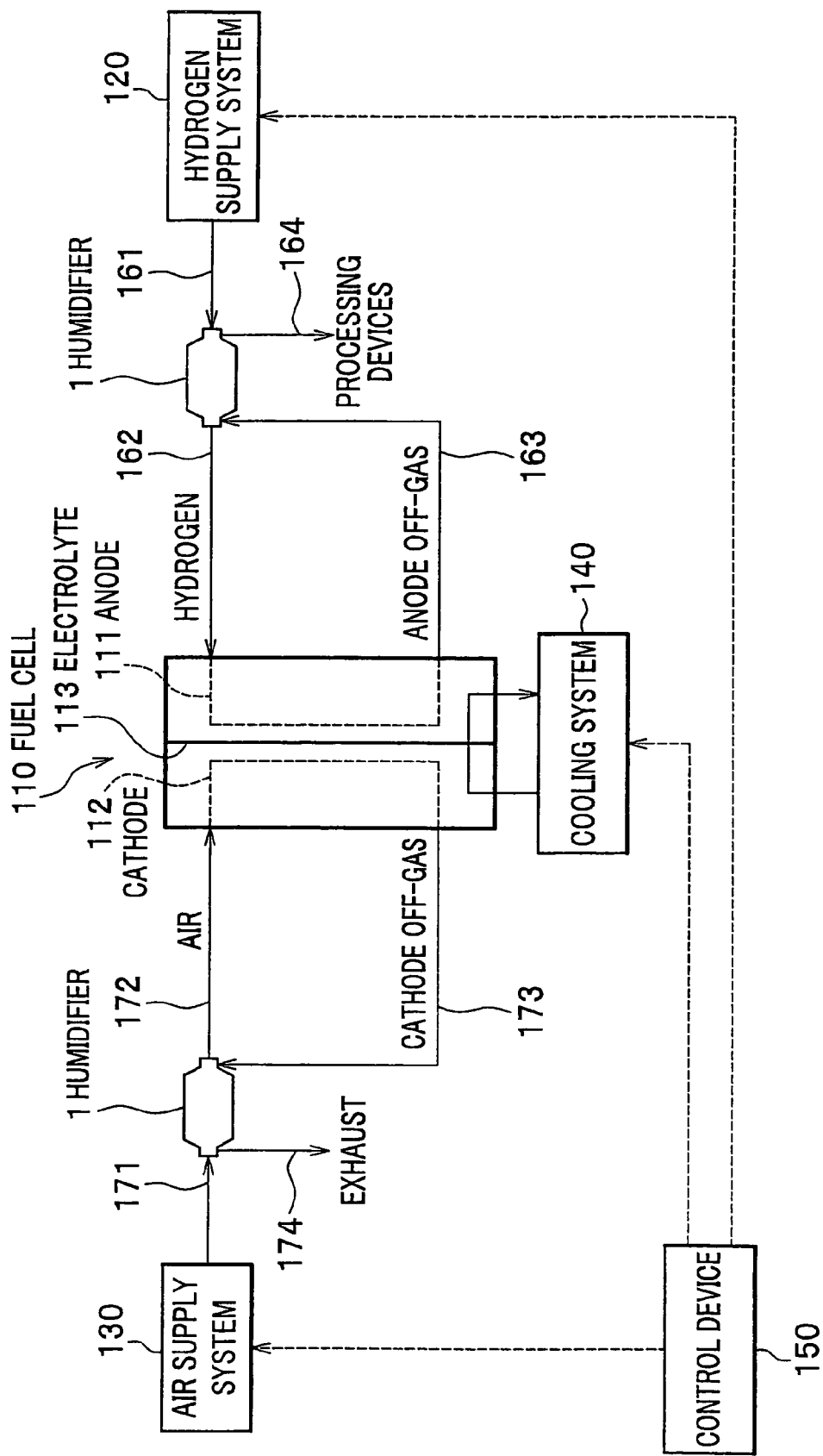
FIG. 2 shows a block diagram of a fuel cell system according to one embodiment of the present invention.

Next, a fuel cell system is explained with reference to FIG. 2. The fuel cell system according to the first embodiment includes a fuel cell 110, a hydrogen supply system 120, an air supply system 130, a cooling system 140, a control device 150 and two humidifiers 1, 1.

As mentioned above, the fuel cell 110 is a PEM type fuel cell including an anode 111, a cathode 112 and an electrolyte 113. To the anode 111, hydrogen (anode gas) as fuel gas is supplied from the hydrogen supply system 120, while to the cathode 112, air (cathode gas) as oxidizing gas is supplied from the air supply system 130. In the fuel cell 110, an electrochemical reaction between the anode gas and the cathode gas is taken place to generate electricity. The thus generated electricity is introduced to the driving motor M (see FIG. 1), accessory equipments and the like for their operation.

The hydrogen supply system 120 supplies hydrogen as anode gas to the anode 111 of the fuel cell 110, and is composed of a high-pressure hydrogen tank, a pressure-reducing valve and the like (which are not shown).

The air supply system 130 supplies air as cathode gas to the cathode 112 of the fuel cell 110, and is composed of an air cleaner, a motor-driven compressor and the like (which are not shown).

The cooling system 140 releases heat to the atmosphere which was generated by the fuel cell 110 during the generation of electricity, and is composed of a radiator, a circulating pump and the like (which are not shown).

The control device 150 is composed of a micro computer, a ROM, a RAM, peripheral circuitry, an I/O interface and the like (which are not shown), and controls the hydrogen supply system 120, the air supply system 130, the cooling system 140 and the like, based on the various operational information detected by sensors (not shown).

On each of the anode gas line (including hydrogen supply tubes 161 and 162) and the cathode gas line (including air supply tubes 171 and 172), the humidifier 1 is installed. To the humidifier 1 installed on the anode gas line are connected anode off-gas inlet piping 163 from the anode 111 of the fuel cell 110 and anode off-gas outlet piping 164 which leads the gas to the processing devices, such as a dilution system. To the humidifier 1 installed on the cathode gas line are connected cathode off-gas inlet piping 173 from the cathode 112 of the fuel cell 110 and cathode off-gas outlet piping 174 which leads the gas to the outside of the vehicle.

<Structure of Humidifier>

Figure 3:
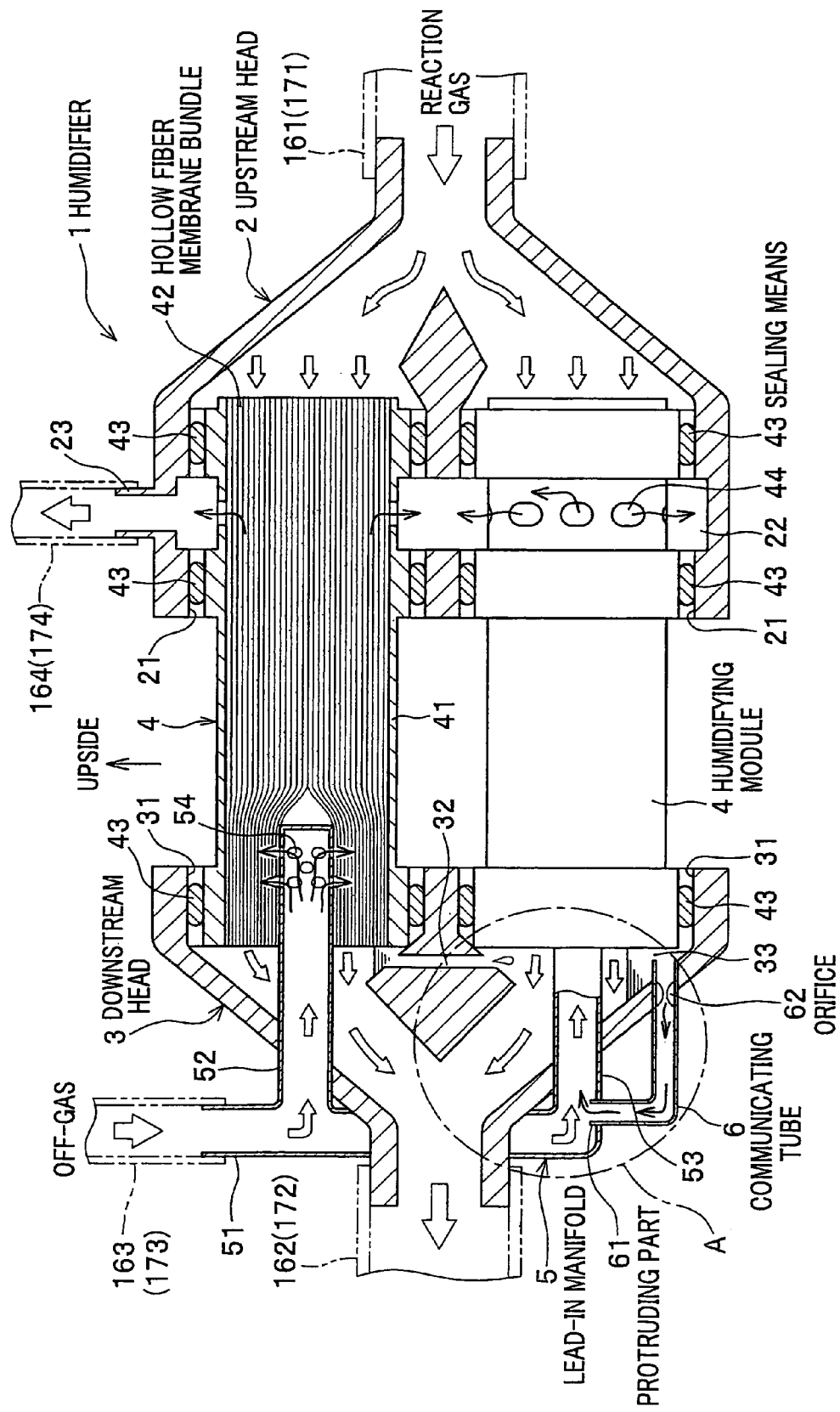
FIG. 3 shows a vertical sectional view of a humidifier according to one embodiment of the present invention.

Hereinbelow, the structure of the humidifier 1 is explained, taking the humidifier installed on the cathode line as a representative example. As shown in FIG. 3, the humidifier 1 is mainly composed of: an upstream head 2 to which the air supply tube 171 and the cathode off-gas outlet piping 174 are connected; a downstream head 3 to which the air supply tube 172 and the cathode off-gas inlet piping 173 are connected; and a vertically arranged pair of humidifying modules 4, 4 held by the heads 2 and 3.

In the upstream head 2 (together with the head 3, referred to as "housing" in the embodiments), dry cathode gas (referred to as "first gas" in the embodiments) is fed from the air supply tube 171, and then sent to the humidifying modules 4, 4. At the same time, the cathode off-gas (referred to as "second gas" in the embodiments) which has passed the humidifying modules 4, 4 is led to the cathode off-gas outlet piping 174. For this purpose, the upstream head 2 has a vertically arranged pair of holding holes 21, 21 to hold the humidifying modules 4, 4, a guide groove 22 to guide the cathode off-gas from the humidifying modules 4, 4, and an off-gas outlet tube 23 to lead the cathode off-gas from the guide groove 22 to the cathode off-gas outlet piping 174.

In the downstream head 3 (together with the head 2, referred to as "housing" in the embodiments), moist cathode gas humidified in the humidifying modules 4, 4 is led to the air supply inlet tube 172, while the cathode off-gas fed from the cathode off-gas inlet piping 173 is introduced to the humidifying module 4, 4. For this purpose, the downstream head 3 has a vertically arranged pair of holding holes 31, 31 to hold the humidifying modules 4, 4 and a lead-in manifold 5 to introduce the cathode off-gas into the humidifying modules 4, 4. The lead-in manifold 5 includes a connecting tube 51 to which the cathode off-gas inlet piping 173 is connected, and a vertically arranged pair of lead-in tubes 52 and 53 each of which is inserted in the corresponding humidifying module 4. On the terminal area of each lead-in tubes 52 and 53, a number of pores 54 are formed, through which the cathode gas flows into the humidifying module 4. The inside of the downstream head 3 has a communicating hole 32 formed in the vicinity of the outlet of the installed humidifying modules 4, 4, through which hole condensed water formed in the upper area of the inside of the head 3 falls down to the lower area.

The humidifying module 4 includes a cylindrical case 41 and a bundle of hollow fiber membranes 42 (referred to as "moisture permeable means" in the embodiments) contained therein. The case 41 is fixed to one of the holding holes 21 of the upstream head 2 using a pair of sealing means 43, 43, and to the corresponding holding hole 31 of the downstream head 3 using a sealing means 43. On the case 41, a plurality of holes 44 is formed in such manner that the holes communicate with the guide groove 22 of the upstream head 2 when the humidifying module 4 is in installed position, and thus the cathode off-gas that had flown outside the hollow fiber membrane bundle 42 is led to the guide groove 22 via these holes 44. The hollow fiber membrane bundle 42 is made of a bundle of a plurality of hollow fiber membranes, and the both ends of the fiber membrane are sealed so that the leaking of the cathode off-gas is prevented.

Figure 4:
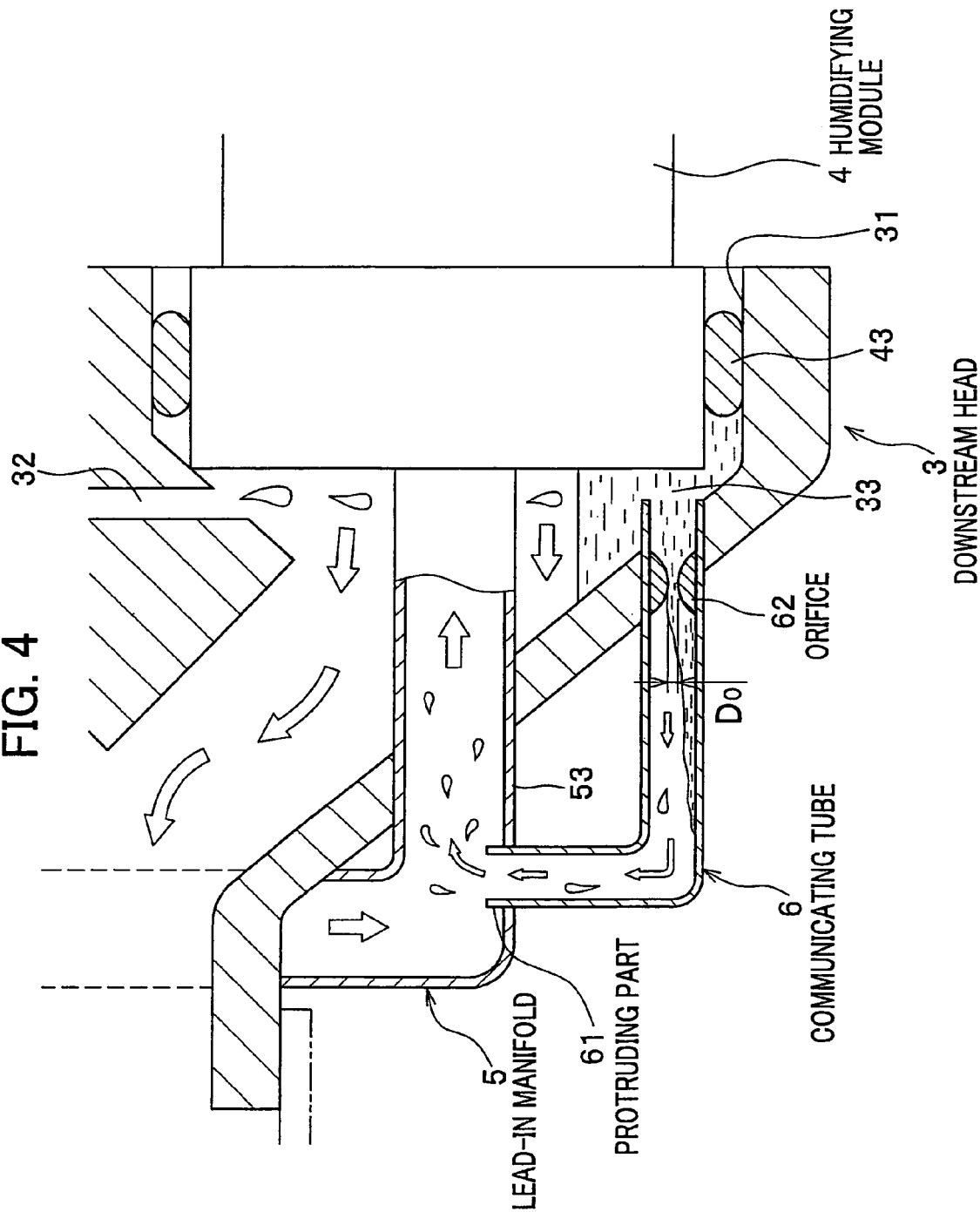
FIG. 4 shows an enlarged view of the area A in FIG. 3.

In the case of the downstream head 3 the present embodiment, there are provided a liquid pool area 33, which is the lowest area of the inside (the inside is referred to as the "first area" in the embodiments), and a nearly L-shaped communicating tube 6 that communicates with the lower lead-in tube 53 of the lead-in manifold 5 (the manifold is referred to as the "second area" in the embodiments). As shown in FIG. 4, the communicating tube 6 penetrates the bottom face of the lead-in tube 53, and the penetrating end serves as the protruding part 61 (referred to as "backflow prevention means" in the embodiments).

On the passage of the communicating tube 6, an orifice 62 (referred to as "flow rate adjusting means" in the embodiments) is provided. In the case of the present embodiment, the diameter $D_0$ of the orifice 62 is set larger than the pore diameter of the hollow fiber membrane of the bundle 42. It is also set larger than the pore diameter of an air cleaner (filter) installed in the air supply system 130. This diameter setting prevents the clogging of the orifice 62 with minute foreign particles which have evaded capture by the hollow fiber membranes or the air cleaner (filter).

<<Mechanism of Embodiment>>

Hereinbelow, the mechanism of the present embodiment is explained with reference to FIGS. 1 to 4.

When the driver turns on the ignition switch (not shown) of the vehicle V, the control device 150 determines the target amount of the current of the fuel cell 110, based on the depression degree of the throttle pedal and the electricity consumption of various devices (such as lighting system and air-conditioning system) The control device 150 also controls the hydrogen supply system 120 and the air supply system 130 so as to provide specific amounts of the anode gas and the cathode gas to the fuel cell 110 that attains the target amount of the current. At the same time, the control device 150 controls the cooling system 140 based on the temperature of the fuel cell 110.

Once the operation of the fuel cell system is initiated, the anode gas from the hydrogen supply system 120 flows through the humidifier 1 and is supplied to the anode 111 of the fuel cell 110. On the other hand, the cathode gas from the air supply system 130 flows through the humidifier 1 and is supplied to the cathode 112 of the fuel cell 110. Now that the gases are in the fuel cell 110, an electrochemical reaction between the anode gas and oxygen contained in the cathode gas is taken place in the electrolyte 113, and electricity is generated (the fuel cell system is in operation).

As the fuel cell system is operated, water is generated at the anode 111 and the cathode 112 of the fuel cell 110. From the anode 111, moist anode off-gas containing the water generated at the anode 111 is supplied to the humidifier 1 via the anode off-gas inlet piping 163, while from the cathode 112, moist cathode off-gas containing the water generated at the cathode 112 is supplied to the humidifier 1 via the cathode off-gas piping 173.

<Mechanism of Humidifier>

Next, the mechanism of the humidifier 1 is explained, taking the humidifier installed on the cathode line as a representative example. It should be noted that the mechanism of the humidifier 1 installed on the anode line is substantially the same as the one on the cathode line.

In the humidifier 1 installed on the cathode line, moist cathode off-gas from the cathode off-gas inlet piping 173 enters the humidifying module 4 via the lead-in manifold 5, flows outside the hollow fiber membranes contained in the module, and is ejected from the off-gas outlet tube 23 of the upstream head 2 to the cathode off-gas outlet piping 174. On the other hand, dry cathode gas from the air supply tube 171 enters the humidifying module 4 via the upstream head 2, flows along the hollow part of the hollow fiber membranes, and is expelled from the downstream head 3 into the air supply tube 172.

In the humidifying module 4, moisture permeates the hollow fiber membranes, i.e. moisture is transferred from the cathode off-gas to the inside of the hollow tubes, due to the difference in partial pressures of water vapor across the membrane between the moist cathode off-gas and the dry cathode gas. As a result, the cathode gas running along the hollow part is humidified. Supplying this moist cathode gas to the cathode 112 prevents the lowering of the output of the fuel cell 110, which may be caused by the absence of water in the electrolyte 113.

As described above, when the moist cathode gas is brought into contact with the downstream head 3 having relatively low temperature as compared with the temperature of the moist cathode gas, moisture contained in the cathode gas is condensed into water. The condensed water is collected at the lowest part of the inside of the head 3 (i.e. the liquid pool area 33), falling down along the inner wall of the head 3 or falling through the communicating hole 32. A portion of the water collected at the bottom flows into the communicating tube 6.

Since the fuel cell 110 used in the present embodiment has a property of losing pressure across the cell, and the pressure of the cathode gas running in the downstream head 3 is higher than that of the cathode off-gas running in the lead-in tube 53, the condensed water present in the communicating tube 6 is subject to suction into the lead-in tube 53. As a result, the condensed water in the communicating tube 6 passes through the orifice 62 and then through the vertical portion of the tube, into the lead-in tube 53. A part of the condensed water now in the lead-in tube 53, together with the moisture already contained in the cathode off-gas, is utilized for humidifying the cathode gas in the humidifying module 4, and the unused portion of the moisture is expelled from the guide groove 22 to the off-gas outlet tube 23, and then exhausted to the external system from the vehicle, via the cathode off-gas outlet piping 174.

Because of the above-explained features of the present embodiment, almost no condensed water remains in the humidifier 1, and therefore, the problem that may arise during severe cold weather is avoided, such as the clogging of the reaction gas supply tube to the fuel cell 110 with frozen water in the humidifier 1. In addition, even when the condensed water became frozen in the communicating tube 6 during nonoperational period, the off-gas with relatively high temperature from the fuel cell 110 heats the communicating tube 6 upon the initiation of the next operation, the frozen water is rapidly melt and the flow of condensed water to the lead-in tube 53 quickly resumes. In the present embodiment, it should be noted that the protruding part 61, which is the penetrating end of the communicating tube 6 into the inside of the lead-in tube 53, serves as a backflow prevention means, preventing the backflow of the condensed water from the lead-in manifold 5 to the downstream head 3 during nonoperational period of the fuel cell system. In addition, this prevention means can be formed easily with low expense. Furthermore, the orifice 62, flow rate adjusting means, is provided on the communicating tube 6, which suppresses the blow-by of the cathode gas from the downstream head 3 to the lead-in tube 53 when there is no condensed water present in the communicating tube 6. The use of the hollow fiber membranes enables the higher humidifying performance while maintaining a compact structure. The use of off-gas in this structure further enables the effective and stable operation of the fuel cell.

<<Modified Embodiments>>

Figure 5:
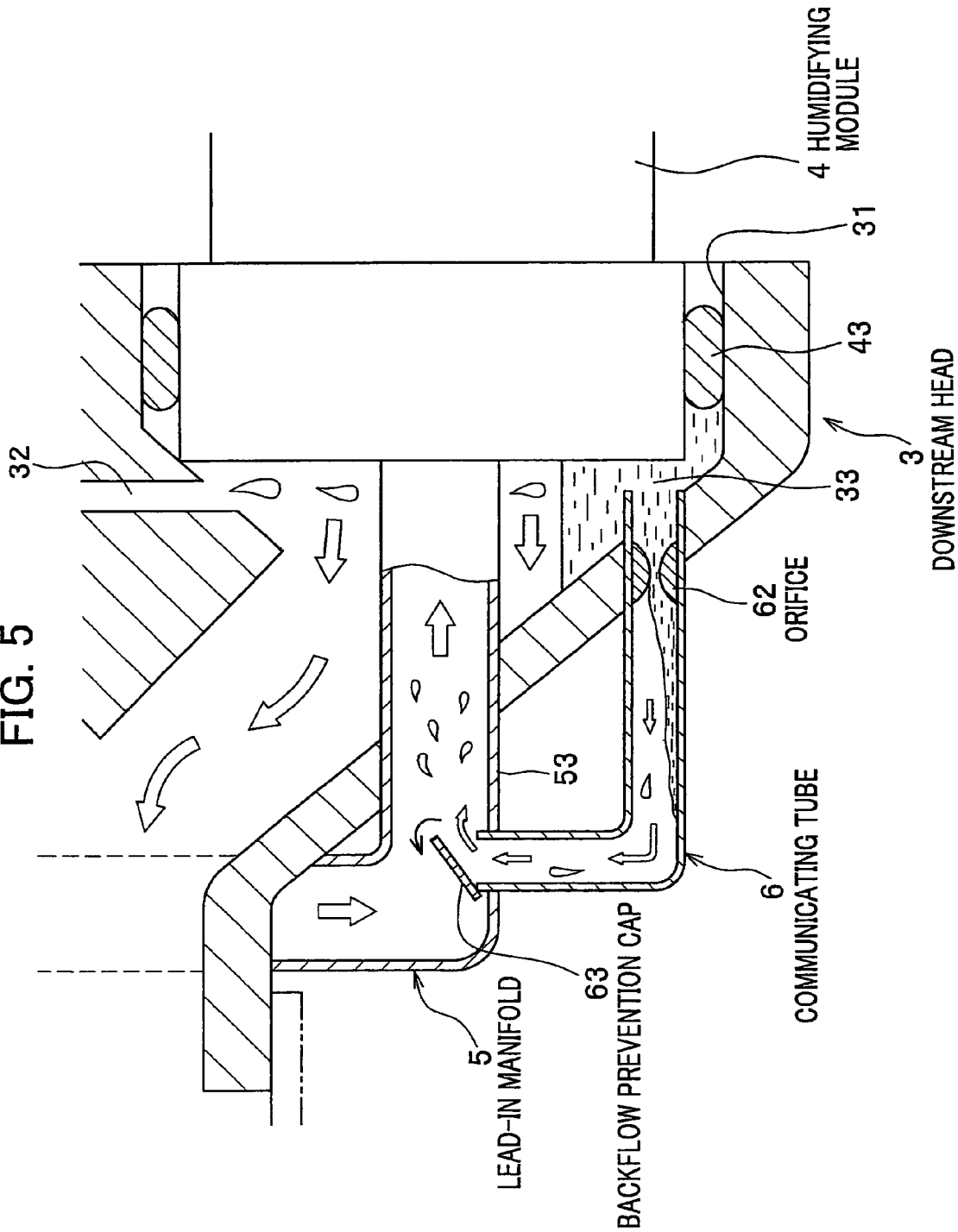
FIG. 5 shows a vertical sectional view of the relevant part of a humidifier according to one modified embodiment.

Each of FIGS. 5 and 6 shows a vertical sectional view of the relevant part of the humidifier according to the modified embodiments. These modified embodiments are substantially the same as the above-mentioned embodiment, except that the different backflow prevention means are introduced.

FIG. 5 shows a modified embodiment in which a backflow prevention cap 63 (referred to as "backflow prevention means" in the embodiments) is provided on one end of the communicating tube 6. During the operation of the fuel cell system, the backflow prevention cap 63 is in an open position since the pressure in the downstream head 3 is higher than that in the lead-in tube 53. However, the backflow prevention cap 63 is closed to block the communicating tube 6, in response to the backflow movement of the condensed water.

FIG. 6 shows a modified embodiment in which a check valve 67 (referred to as "backflow prevention means" in the embodiments) including a ball valve 65 and a valve seat 66 is provided on one end of the communicating tube 6. During the operation of the fuel cell system, the check valve 67 is in an open position with the ball valve 65 floating from the valve seat 66, since the pressure in the downstream head 3 is higher than that in the lead-in tube 53. However, the ball valve 65 sits on the valve seat 66 and the check valve 67 is closed to block the communicating tube 6, in response to the backflow movement of the condensed water.

From the aforementioned explanation, those skilled in the art ascertain the essential characteristics of the present invention and can make the various modifications and variations to the present invention to adapt it to various usages and conditions without departing from the spirit and scope of the claims. For example, while in the above-mentioned embodiments the humidifier includes two humidifying modules supported by two heads, a single module or three or more modules may be installed in the humidifier of the present invention, or a single housing may be used for the humidifier of the present invention to contain a bundle of hollow fiber membranes. While in the above-mentioned embodiments a bundle of hollow fiber membranes is used for transferring water, a moisture permeation membrane and the like may be used as well. While in the above-mentioned embodiments the reaction gas (first gas) flows along the hollow part of the hollow fiber membranes and the off-gas (second gas) flows outside the hollow fiber membranes, alternatively, the first gas may flow outside the hollow fiber membranes and the second gas may flow along the hollow part. While in the above-mentioned embodiments the anode off-gas is used for humidifying the anode gas, and the cathode off-gas for the cathode gas, for example, the cathode off-gas may be used for humidifying both the anode gas and the cathode gas. While in the above-mentioned embodiments the communicating tube is formed on the downstream head, alternatively, it may be connected to the upstream head. Further, while in the above-mentioned embodiments the communicating tube protrudes upward from the bottom side of the lead-in tube, it may protrude downward. While in the above-mentioned embodiment the lead-in tube is inserted in the humidifying module and the off-gas is allowed to flow from the inside of the module towards the outside, alternatively, the lead-in tube may be placed outside the humidifying module, to allow the flow of the off-gas from the outside of the module towards the inside.

What is claimed is:

1. A humidifier which is used for a fuel cell that generates electricity by means of a chemical reaction of anode gas supplied to the anode and cathode gas supplied to the cathode, and exhausts anode off-gas from the anode and cathode off-gas from the cathode, comparing:

a housing having a first area for passing a first gas and a second area for passing a second gas having higher water content than that of the first gas, the first gas being either the anode gas or the cathode gas, and the second gas being at least either the anode off-gas or the cathode off-gas;

a moisture permeable means for transferring moisture from the second gas to the first gas to humidify the first gas;

a liquid pool portion for pooling condensed water formed in the first area; and a communicating path formed on the housing through which the first area and the second area communicate with each other, with one end of the communicating path being positioned at the liquid pool portion, to transfer condensed water formed in the first area to the second area.

2. The humidifier according to claim 1, wherein the communicating path has a flow rate adjusting means for adjusting the amount of the first gas flow.

3. The humidifier according to claim 2, wherein the flow rate adjusting means comprises an orifice having a diameter larger than at least either a pore diameter of the moisture permeable means or a pore diameter of a filter installed in a flow path of the first gas.

4. The humidifier according to claim 1, wherein a backflow prevention means is formed on the communicating path for preventing the flow of the fluid from the second area to the first area.

5. The humidifier according to claim 2, wherein a backflow prevention means is formed on the communicating path for preventing the flow of the fluid from the second area to the first area.

6. The humidifier according to claim 3, wherein a backflow prevention means is formed on the communicating path for preventing the flow of the fluid from the second area to the first area.

7. The humidifier according to claim 4, wherein the backflow prevention means is provided by forming a tube as the communicating path in such manner that the tube is connected to the second area from the bottom side of the second area and the connected end of the tube protrudes into the second area.

8. The humidifier according to claim 5, wherein the backflow prevention means is provided by forming a tube as the communicating path in such manner that the tube is connected to the second area from the bottom side of the second area and the connected end of the tube protrudes into the second area.

9. The humidifier according to claim 6, wherein the backflow prevention means is provided by forming a tube as the communicating path in such manner that the tube is connected to the second area from the bottom side of the second area and the connected end of the tube protrudes into the second area.

10. The humidifier according to claim 1, wherein the moisture permeable means is a bundle of hollow fiber membranes, and the first gas is allowed to flow along either the outside or inside of the fiber membrane while the second gas having higher water content than that of the first gas is allowed to flow along the other side of the fiber membrane.

11. The humidifier according to claim 4, wherein the backflow prevention means comprises a backflow prevention cap disposed on a second-area-side end of a tube as the communicating path.

12. The humidifier according to claim 5, wherein the backflow prevention means comprises a backflow prevention cap disposed on a second-area-side end of a tube as the communicating path.

13. The humidifier according to claim 6, wherein the backflow prevention means comprises a backflow prevention cap disposed on a second-area-side end of a tube as the communicating path.

14. The humidifier according to claim 4, wherein the backflow prevention means comprises a check valve disposed on a second-side-area end of a tube as the communicating path.

15. The humidifier according to claim 5, wherein the backflow prevention means comprises a check valve disposed on a second-side-area end of a tube as the communicating path.

16. The humidifier according to claim 6, wherein the backflow prevention means comprises a check valve disposed on a second-side-area end of a tube as the communicating path.

17. A vehicle fuel cell comprising the humidifier according to claim 1.

18. The humidifier according to claim 1, wherein:
the one end of the communicating path is positioned downstream of the moisture permeable means in the first area; and
the other end of the communicating path is positioned upstream of the moisture permeable means in the second area.

* * * * *